US010960814B2

(12) United States Patent
Goeke et al.

(10) Patent No.: US 10,960,814 B2
(45) Date of Patent: Mar. 30, 2021

(54) MOTOR VEHICLE COMPRISING AN ILLUMINATION DEVICE FOR PROJECTING AN IMAGE

(71) Applicant: Bayerische Motoren Werke Aktiengesellschaft, Munich (DE)

(72) Inventors: Tim Goeke, Munich (DE); Marcel Sieler, Menlo Park, CA (US)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 198 days.

(21) Appl. No.: 15/469,032

(22) Filed: Mar. 24, 2017

(65) Prior Publication Data
US 2017/0190285 A1    Jul. 6, 2017

Related U.S. Application Data

(63) Continuation of application No. PCT/EP2015/069594, filed on Aug. 27, 2015.

(30) Foreign Application Priority Data

Sep. 25, 2014    (DE) .................... 10 2014 219 371.0

(51) Int. Cl.
*B60Q 1/50*    (2006.01)
*G03B 21/00*    (2006.01)
(Continued)

(52) U.S. Cl.
CPC ............ *B60Q 1/503* (2013.01); *B60Q 1/52* (2013.01); *G02B 27/0101* (2013.01);
(Continued)

(58) Field of Classification Search
CPC ... B60Q 1/24; B60Q 1/50; B60Q 1/52; G03B 21/00; G03B 21/14; H04N 9/31; G02B 2027/01; G02B 27/01
See application file for complete search history.

(56) References Cited

U.S. PATENT DOCUMENTS 5,406,395 A * 4/1995 Wilson ..................... B60Q 1/48
  356/153
8,777,424 B2   7/2014 Schreiber et al.
(Continued)

FOREIGN PATENT DOCUMENTS

CN    101218127 A    7/2008
CN    102371937 A    3/2012
(Continued)

OTHER PUBLICATIONS

PCT/EP2015/069594, International Search Report dated Nov. 18, 2015 (Three (3) pages).
(Continued)

*Primary Examiner* — Michelle M Iacoletti
*Assistant Examiner* — Danell L Owens
(74) *Attorney, Agent, or Firm* — Crowell & Moring LLP

(57) ABSTRACT

An illumination device of a motor vehicle includes one or more multi-aperture projection displays, where a respective multi-aperture projection display contain a luminous means for illuminating a plurality of object structures and an array of projection lenses. Each projection lens is assigned to an object structure which is projected by the respective projection lens into at least one projection plane extending perpendicularly or obliquely with respect to the ground in an area surrounding the motor vehicle. The one or more multi-aperture projection displays are configured such that an overall image containing symbols perceivable by a driver of the motor vehicle is produced in the at least one projection plane by the projected object structures.

11 Claims, 9 Drawing Sheets

(51) Int. Cl.
*G02B 27/01* (2006.01)
*H04N 9/31* (2006.01)
*B60Q 1/52* (2006.01)
*B60Q 9/00* (2006.01)
*G03B 21/14* (2006.01)

(52) U.S. Cl.
CPC ......... *G02B 27/0172* (2013.01); *G03B 21/00* (2013.01); *G03B 21/001* (2013.01); *G03B 21/14* (2013.01); *H04N 9/3147* (2013.01); *H04N 9/3179* (2013.01); *B60Q 9/007* (2013.01); *B60Q 2400/50* (2013.01); *G02B 2027/0127* (2013.01)

(56) References Cited

U.S. PATENT DOCUMENTS

| | | | |
|---|---|---|---|
| 9,247,222 B2 | 1/2016 | Sieler et al. | |
| 2005/0073397 A1* | 4/2005 | Zheng | B60Q 1/48 340/435 |
| 2011/0228231 A1* | 9/2011 | Schreiber | G02B 3/0056 353/31 |
| 2012/0092623 A1* | 4/2012 | Huebner | G03B 21/001 352/81 |
| 2013/0120572 A1* | 5/2013 | Kwon | B62D 15/0295 348/148 |
| 2013/0158851 A1* | 6/2013 | Herrmann | G06F 17/00 701/300 |
| 2014/0146290 A1* | 5/2014 | Sieler | G03B 21/001 353/30 |
| 2015/0062446 A1 | 3/2015 | Schreiber et al. | |
| 2016/0065921 A1 | 3/2016 | Sieler et al. | |
| 2017/0182934 A1* | 6/2017 | Arita | B60Q 1/50 |

FOREIGN PATENT DOCUMENTS

| | | |
|---|---|---|
| DE | 590 399 C | 1/1934 |
| DE | 10 2006 059 684 A1 | 6/2008 |
| DE | 10 2009 024 894 A1 | 12/2010 |
| DE | 10 2011 076 083 A1 | 11/2012 |
| DE | 10 2012 207 621 A1 | 11/2013 |
| DE | 10 2013 208 625 A1 | 11/2014 |
| FR | 2 967 625 A1 | 5/2012 |
| GB | 2 482 951 A | 2/2012 |
| WO | WO 2013/111032 A1 | 8/2013 |
| WO | WO 2013/167705 A1 | 11/2013 |
| WO | WO 2014/180991 A1 | 11/2014 |

OTHER PUBLICATIONS

German Search Report issued in German counterpart application No. 10 2014 219 371.0 dated Aug. 13, 2015, with Statement of Relevancy (Seven (7) pages).

Chinese Office Action issued in Chinese counterpart application No. 201580033654.7 dated Feb. 24, 2018, with English translation (Nineteen (19) pages).

* cited by examiner

MOTOR VEHICLE COMPRISING AN ILLUMINATION DEVICE FOR PROJECTING AN IMAGE

CROSS REFERENCE TO RELATED APPLICATIONS

This application is a continuation of PCT International Application No. PCT/EP2015/069594, filed Aug. 27, 2015, which claims priority under 35 U.S.C. § 119 from German Patent Application No. 10 2014 219 371.0, filed Sep. 25, 2014, the entire disclosures of which are herein expressly incorporated by reference.

BACKGROUND AND SUMMARY OF THE INVENTION

The invention relates to a motor vehicle comprising an illumination device.

The prior art discloses driver assistance systems which indicate, to the driver of a motor vehicle, the distance between the vehicle body and objects in the surrounding area. In the case of parking assistance systems for example, the distance between the motor vehicle and possible obstacles is measured using ultrasound and is conveyed to the driver acoustically or visually on a display in the vehicle interior.

Conventional assistance systems for indicating the distance are costly since they require a multiplicity of sensors, cable harnesses, software logic and a display for visualizing the distance of the vehicle.

An object of the invention is to provide a motor vehicle comprising an illumination device in which the distance to objects in the area surrounding the vehicle is visualized in a simple manner.

This object is achieved by means of the motor vehicle according to patent claim 1. Developments of the invention are defined in the dependent claims.

The motor vehicle according to the invention comprises an illumination device which comprises one or more multi-aperture projection displays. A respective multi-aperture projection display contains a luminous means for illuminating a multiplicity of object structures and an array of projection lenses, each projection lens being assigned to an object structure which is projected by the respective projection lens into at least one projection plane. The projection plane extends perpendicularly and/or obliquely with respect to the ground in the area surrounding the motor vehicle, in particular at an angle of 45° or more, preferably 80° or more, with respect to the ground. The multi-aperture projection display(s) is/are configured in such a manner that an overall image containing symbols which can be perceived by the driver of the motor vehicle is produced in the at least one projection plane by means of the projected object structures. According to the principle of projection, the overall image in the respective projection planes is visible to the driver when the surface of an obstacle or detector or screen is in the corresponding projection plane. Constructive superimposition of all individual images/projections of the object structures takes place in the respective projection plane, which results in sharp imaging of the target symbols. In one preferred variant, the multi-aperture projection display also comprises, in addition to the array of projection lenses, an array of field lenses which is arranged between the luminous means and the object structures.

The invention is distinguished by the fact that one or more multi-aperture projection displays known per se are used for the first time to indicate the presence of an obstacle in corresponding projection planes by imaging symbols and to hereby visualize the distance between the object and the motor vehicle. This provides a passive distance display purely by means of an illumination device without special logic. The multi-aperture projection displays disclosed in the document DE 10 2009 024 894 A1 and in the document DE 10 2011 076 083 A1 are preferably used in the motor vehicle according to the invention. The entire disclosure in said documents is incorporated in the present application by reference.

In one particularly preferred embodiment, the multi-aperture projection display(s) is/are configured in such a manner that different overall images containing different symbols which can be perceived by the driver of the motor vehicle are generated in a plurality of projection planes at a different distance from the motor vehicle. The distance between the projection planes and the motor vehicle should be understood as meaning the shortest distance between the corresponding projection plane and the outer surface of the motor vehicle. This variant of the invention has the advantage that a plurality of symbols can be used to convey to the driver of the motor vehicle how the distance between his motor vehicle and objects in the surrounding area changes.

In another preferred variant, one or more individual multi-aperture projection displays are configured in such a manner that different overall images containing different symbols which can be perceived by the driver of the vehicle are generated in a plurality of projection planes at a different distance from the motor vehicle using the respective individual multi-aperture projection display. In other words, in this embodiment, the function of representing different symbols in different projection planes is separately integrated in individual multi-aperture projection displays.

In one preferred embodiment, a plurality of projection planes are generated using an individual multi-aperture projection display by means of a suitable modification of the multi-aperture projection display described in the documents mentioned at the outset. According to this modification, the object structures of an individual multi-aperture projection display are the combination of a plurality of separate object arrays (also referred to as arrays below) of object structures consisting of transmissive and opaque regions. The separate object arrays are configured in such a manner that an overall image of a respective projection plane at a distance from the motor vehicle which differs in comparison with the other separate arrays is generated for each separate array. The separate arrays are combined here in such a manner that only those transmissive regions which occur in the object structures of all separate object arrays are represented. The object structures of the combination are opaque in all other regions. In one preferred variant of the embodiment just described, a respective projection lens for projecting the object structure is assigned to each object structure in each separate array, the center distance of adjacent object structures in each separate array differing from the center distance of adjacent assigned projection lenses and differing from the center distance of the corresponding object structures in the other separate arrays. The method of operation of the embodiment just described is explained in more detail again in the detailed description. This configuration of the invention makes it possible to sharply image different symbols at different distances from the motor vehicle in a simple manner using a single multi-aperture projection display.

In another preferred embodiment, at least some of the symbols (that is to say at least one symbol) respectively comprise one or more characters and/or pictograms and/or numbers. In order to accurately indicate the distance between objects and the motor vehicle, in another embodiment, at least some of the symbols respectively indicate the distance between the corresponding projection planes and the motor vehicle.

In another variant, at least some of the symbols respectively comprise a warning for the driver. In the case of a plurality of different symbols in different projection planes, the symbols in the projection plane at the shortest distance from the motor vehicle preferably comprise the warning. Provision may likewise be made for the symbols in those projection planes whose distance from the motor vehicle undershoots a predetermined threshold to comprise the warning for the driver. With the variant just described, a special suggestion is again produced for the driver in the case of shorter distances to other objects, thus further reducing the risk of an accident.

In another preferred embodiment, the projection plane(s) is/are in front of the vehicle front and preferably substantially perpendicular to the vehicle front for at least some of the multi-aperture projection displays. This variant of the invention is suitable, in particular, for implementing a parking assistance system or distance control with respect to vehicles traveling in front.

In another variant of the motor vehicle according to the invention, the projection plane(s) is/are behind the vehicle rear and preferably substantially perpendicular to the vehicle rear for at least some of the multi-aperture projection displays. In this case, a camera which captures the projection plane(s) is preferably provided in the vehicle rear, the image from the camera being displayed to the driver on a display in the vehicle interior. This variant is again suitably used to implement a parking assistance system or distance control with respect to vehicles traveling behind.

In another configuration of the motor vehicle according to the invention, the projection plane(s) run(s) parallel to the longitudinal axis of the motor vehicle and offset with respect to a longitudinal side of the motor vehicle laterally beside and/or in front of and/or behind the longitudinal side for at least some of the multi-aperture projection displays. This variant of the invention is suitably used to provide confined space light which is used to indicate, to the driver of the motor vehicle, the lateral distance between his vehicle and the confined space when driving through confined spaces. One or more projection planes are preferably provided on both longitudinal sides of the motor vehicle.

In one variant of the embodiment just described, the symbols comprise a line running parallel to the longitudinal axis of the motor vehicle. This is used to easily and intuitively convey to the driver the lateral distance between his vehicle and confined spaces. If a plurality of projection planes having different symbols are produced, the line with the smallest offset with respect to the longitudinal side is preferably solid, as a result of which a warning that the distance to the confined space is becoming very short is conveyed to the driver. In contrast, lines with a greater offset can be represented as dashed lines, for example.

In another preferred variant of the motor vehicle according to the invention, at least one multi-aperture projection display is provided in at least one headlight and/or at least one taillight of the motor vehicle. On account of the compact dimensions of multi-aperture projection displays in the range of a few centimeters, it is possible to integrate these displays in headlights or taillights without any problems.

In another configuration of the motor vehicle according to the invention, at least one multi-aperture projection display is respectively integrated in a left headlight and a right headlight and/or in a left taillight and a right taillight.

Exemplary embodiments of the invention are described in detail below using the accompanying figures, in which:

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
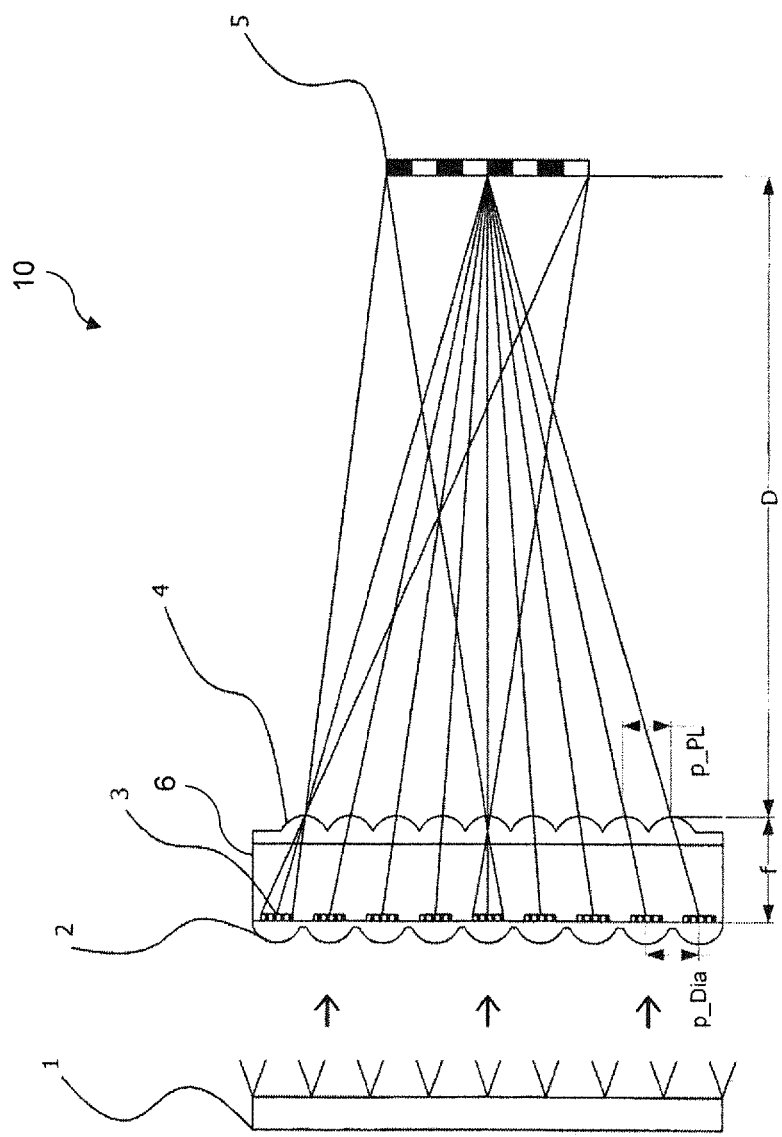
FIG. 1 shows a sectional view of a multi-aperture projection display which can be used in one embodiment of the motor vehicle according to the invention.

FIG. 1 shows a multi-aperture projection display which is known per se and is known from the document DE 10 2009 024 894 A1. This projection display is used in one embodiment of the motor vehicle according to the invention. The projection display 10 comprises a luminous means 1 which may be in the form of a laser diode or LED or OLED, for example. The light from the luminous means falls onto a field lens array in the form of a multiplicity of condenser lenses 2 which are applied to a substrate 6 (for example a glass substrate), an object structure 3 consisting of transmissive and opaque regions being situated adjacent to each condenser lens 2. An array of projection lenses 4 is situated on that side of the glass substrate which is opposite the side having the object structures, the distance between the projection lenses and the object structures 3 corresponding substantially to the focal length f of the individual projection lenses. Each projection lens is assigned to an object structure which is imaged in the projection plane 5 at the distance D from the array of projection lenses via the corresponding projection lens. This is illustrated by the beam paths shown. It is seen in this case that the pitch spacing p_Dia between adjacent object structures 3 is greater than the pitch spacing p_PL between adjacent projection lenses 4. This causes tilting of the optical axis of the corresponding pairs of object structure and projection lens and therefore achieves superimposition of all projected images of the object structures 3 to form an overall image in the projection plane 5.

The magnification M of the overall image in the projection plane 5 follows from the ratio of the projection distance D to the focal length f of the projection lenses 4 and is as follows:

$$M = \frac{D}{f} = \frac{p\_PL}{p\_Dia - p\_PL} \qquad (1)$$

The magnification therefore depends on the difference in the pitch spacings between the object structures and the projection lenses. The smaller this difference, the greater the magnification and therefore the further the projection plane is from the projection display.

Figure 2:
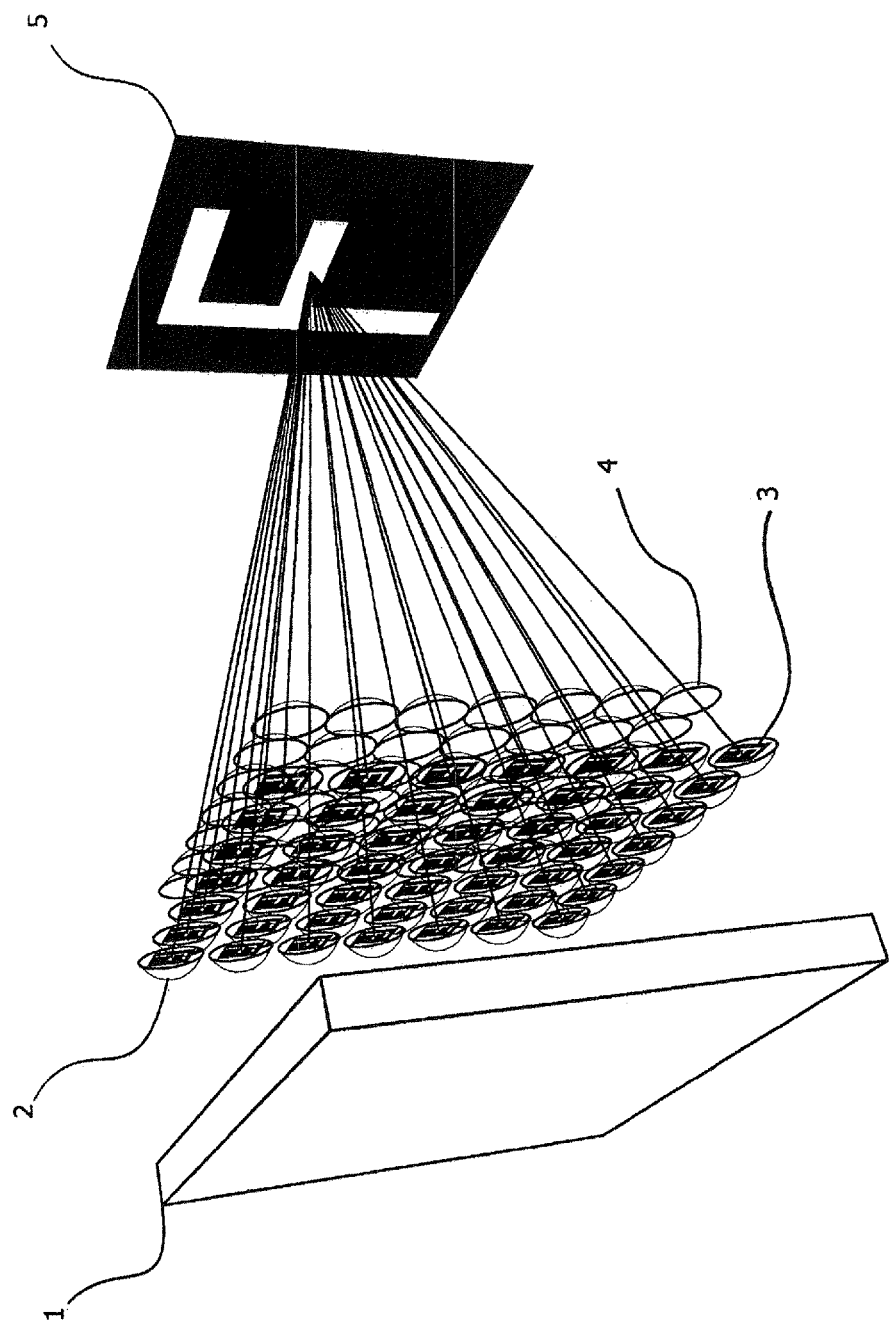
FIG. 2 shows a perspective view for illustrating the projection of the multi-aperture projection display from FIG. 1.

FIG. 2 again illustrates the image projection of the arrangement in FIG. 1. By way of example, object structures are represented in this case in the form of the transmissive letter "F". As can be seen from FIG. 2, each individual letter is imaged in the same magnified letters in the projection plane 5 using a corresponding projection lens 4. The latter in the projection plane 5 is therefore a superimposition of the imaging of all object structures.

A bright and very compact projection module having dimensions in the range of a few centimeters is provided using the multi-aperture projection display from FIG. 1. In this case, it is also possible to achieve imaging in oblique projection surfaces or free-form surfaces in a simple manner. A corresponding projection display having projection free-form surfaces or tilted projection surfaces is known from the document DE 10 2011 076 083 A1.

Figure 3:
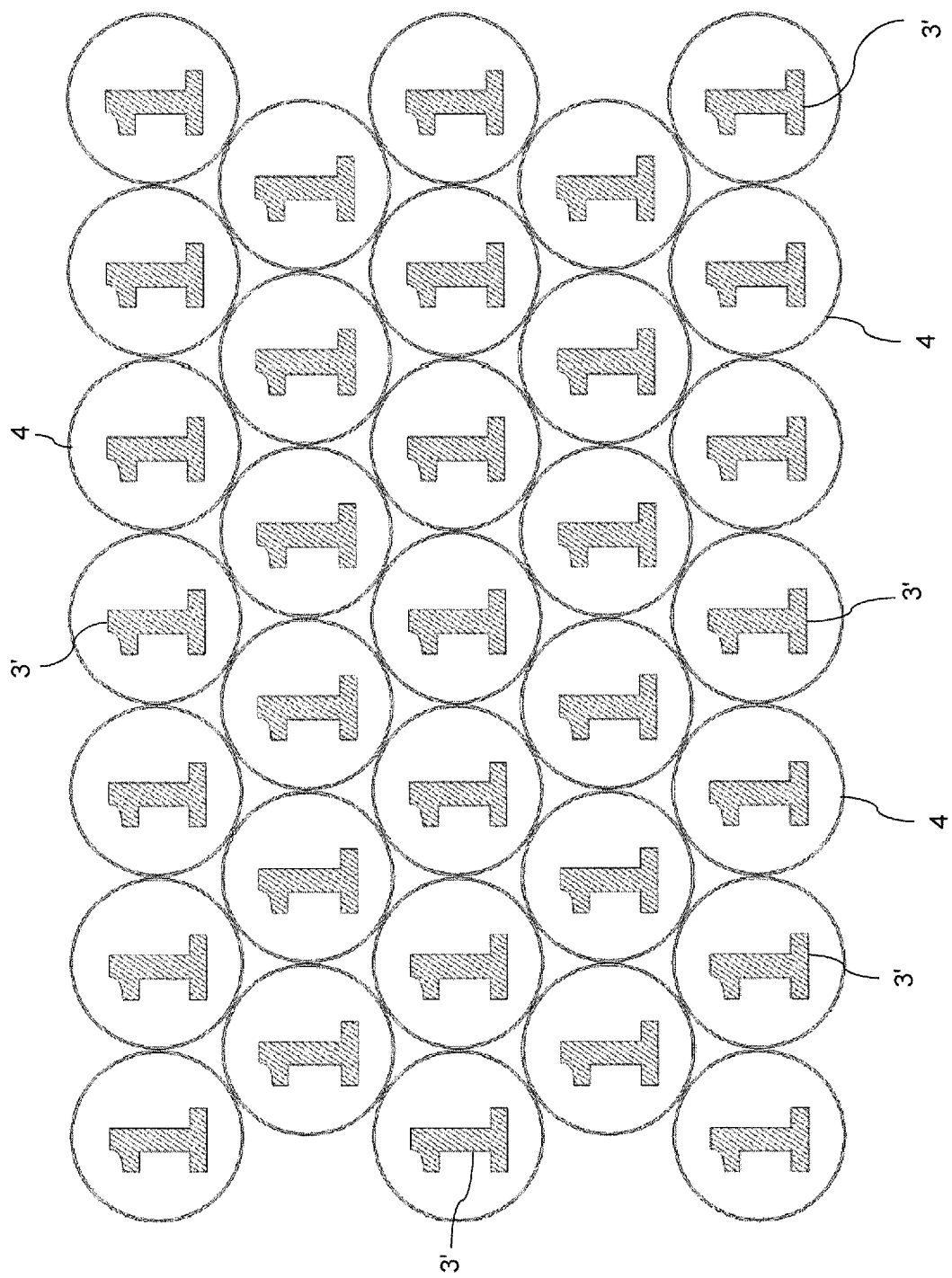
FIG. 3 to FIG. 6 show a plan view of object structures for an embodiment of a multi-aperture projection display which can be used to generate overall images in a plurality of projection planes.
Figure 4:
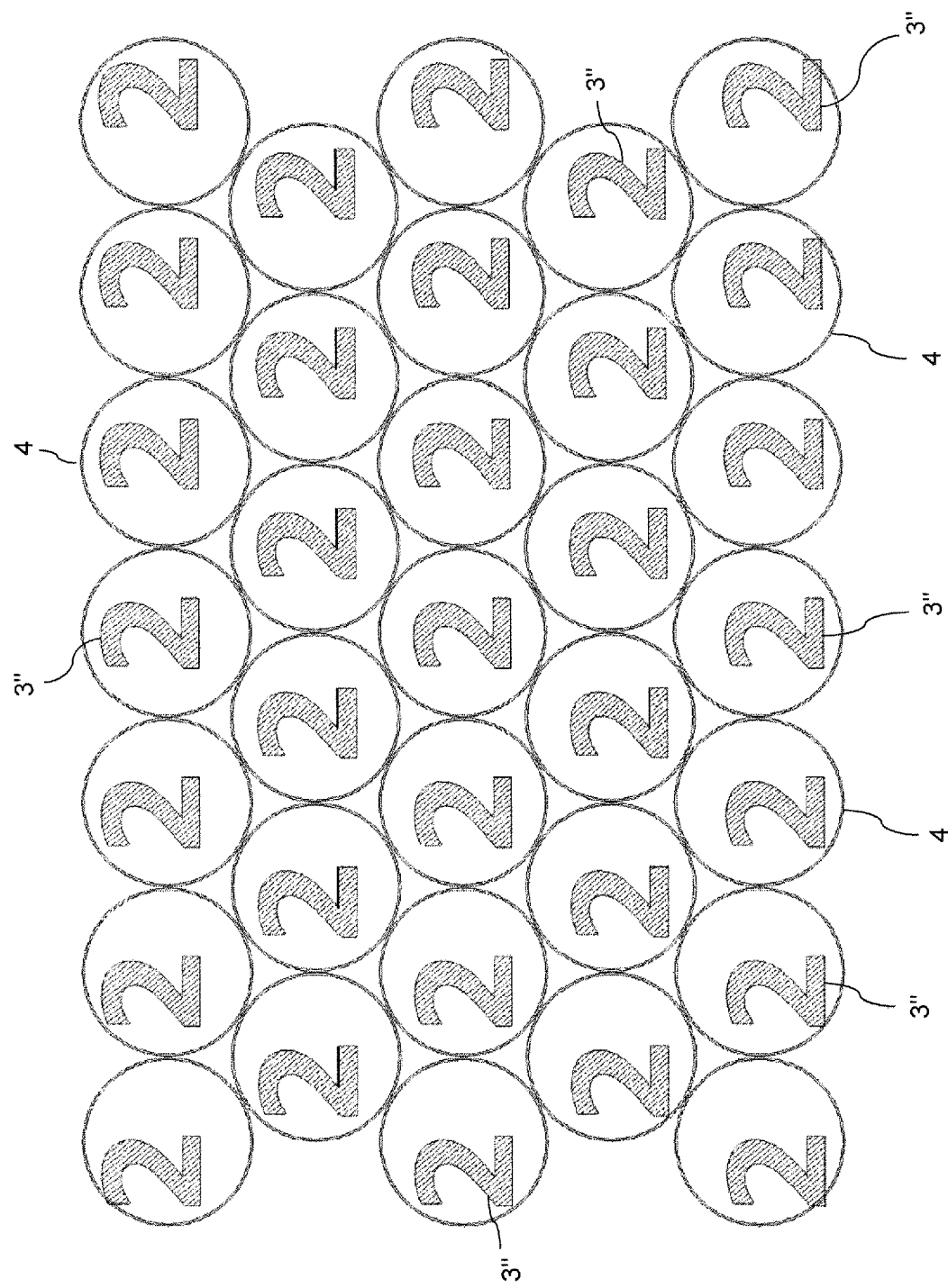

In one particularly preferred embodiment of the invention, use is made of a modification of the projection display from FIG. 1 in which different images are generated in two and possibly also more different projection planes. This is illustrated in FIG. 3 to FIG. 6 for two different projection planes and is achieved by combining two separate and different object structures 3' and 3". For the purpose of illustration, the projection lenses 4 are schematically indicated beside the object structures 3 and 3" in FIG. 3 to FIG. 6. The pitch spacing of the object structures 3 and 3" differs from the pitch spacing of the projection lenses 4, which is not clear from FIG. 3 on account of the schematic illustration. The object structures 3' and 3" are temporary or virtual object structures since the two object structures are suitably combined in the plane of the object structures when producing the projection display. FIG. 3 shows, in a plan view of the array of projection lenses, a first array of object structures 3' in the form of transmissive numbers "1", the individual numbers being indicated by hatching which is inclined to the right. For reasons of clarity, only some of the numbers are provided with the reference symbol 3' and only some of the projection lenses are provided with the reference symbol 4. In a similar manner, FIG. 4 shows a second array of object structures 3" consisting of the transmissive letter "2", in which case only some of these object structures are provided with the reference symbol 3" for reasons of clarity. In order to distinguish them from the object structures 3', the object structures 3" are represented by hatching which is inclined to the left. In both object structures 3' and 3", the region around the corresponding numbers "1" and "2" is opaque.

Figure 5:
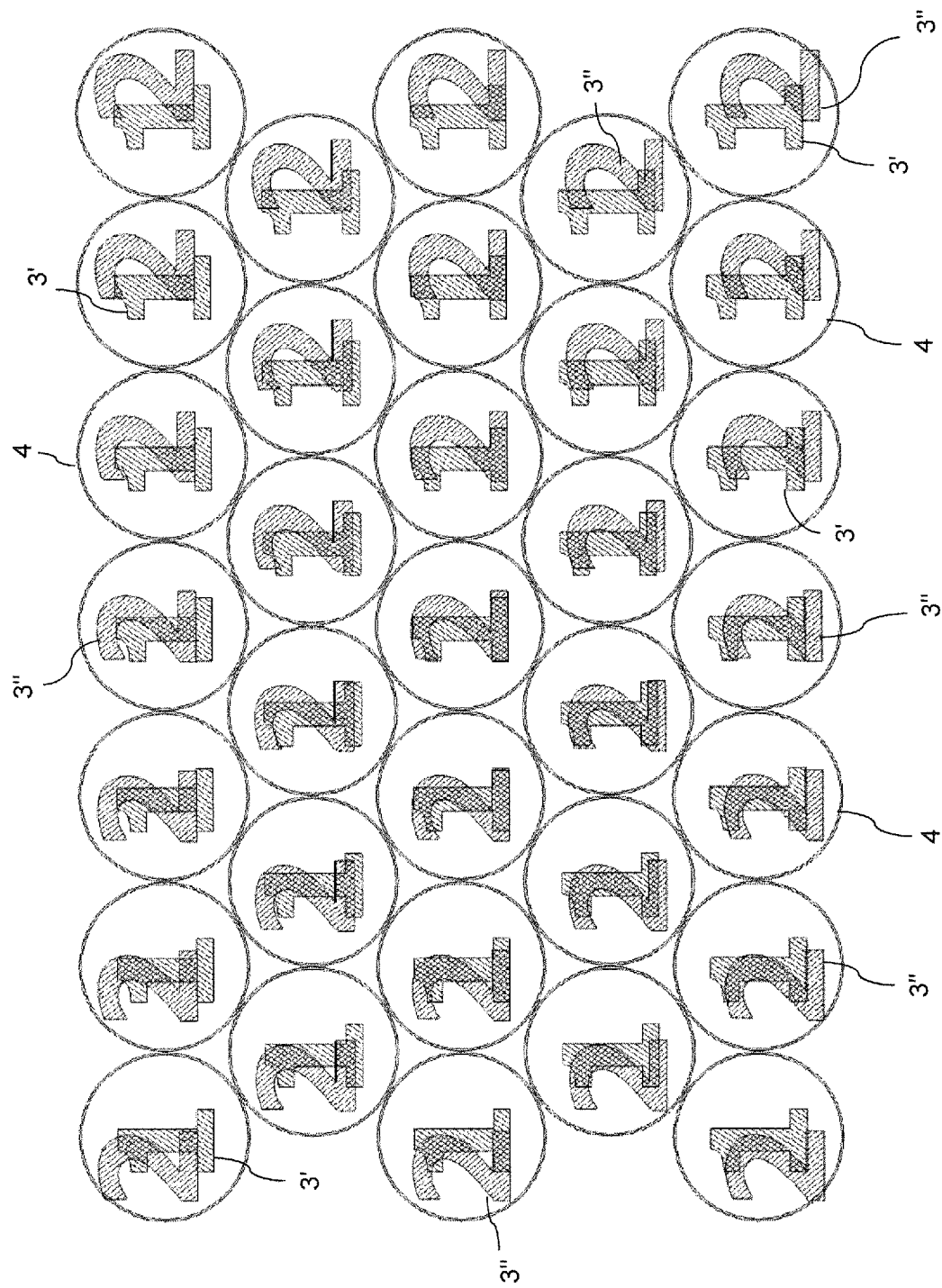
Figure 6:
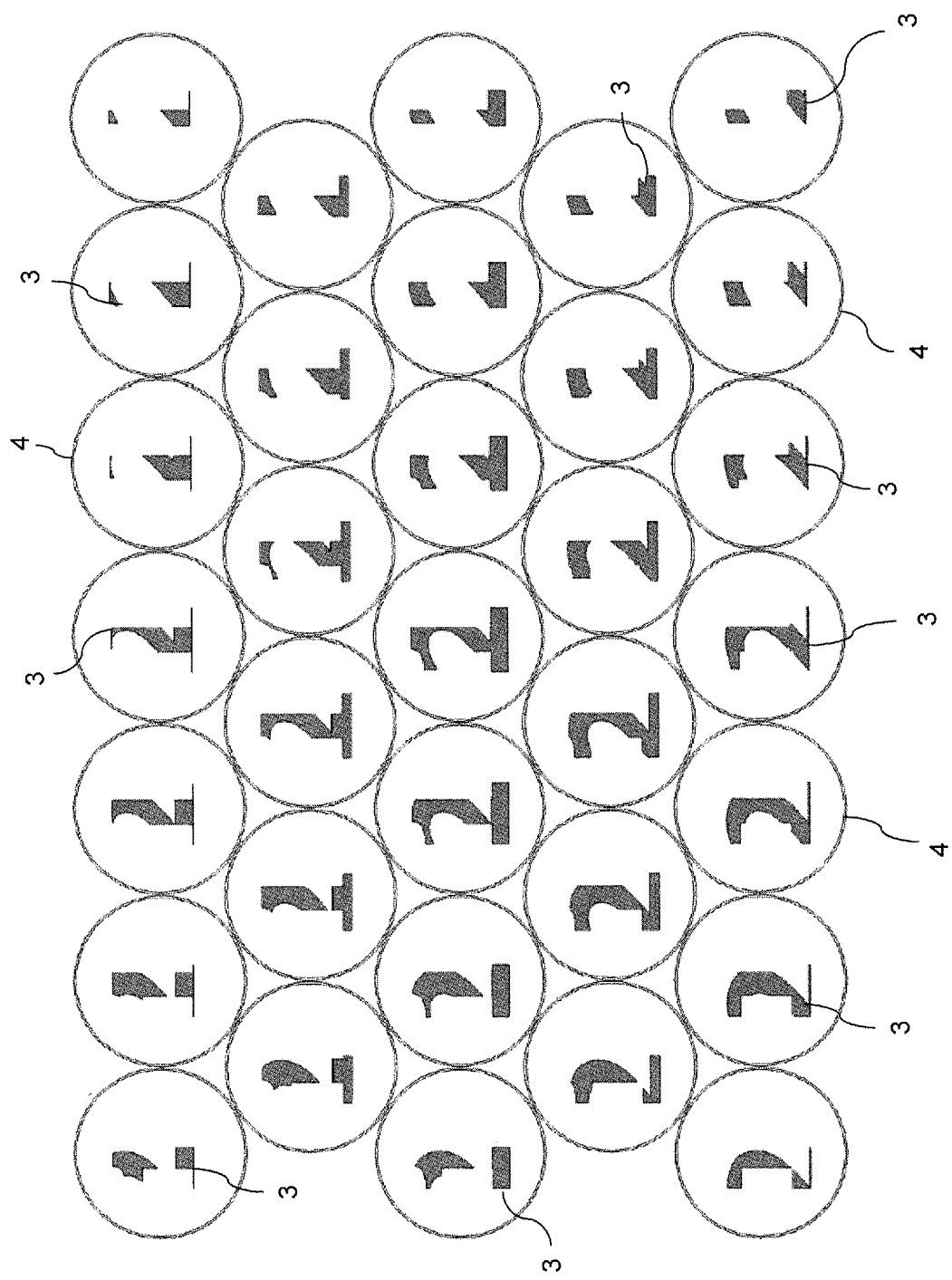

The pitch spacing of the first array of object structures 3' is smaller than the pitch spacing of the second array of object structures 3". Consequently, according to the above equation (1), a projection plane at a greater distance from the projection display than for the array of object structures 3" results for the array of object structures 3'. FIG. 5 shows the superimposition of the two arrays from FIG. 3 and FIG. 4. An AND operation is now applied to this superimposition, with the result that only the (overlapping) transmissive regions which occur together in both object structures 3' and 3" are represented. The transmissive regions which do not overlap are opaque. This results in the array of object structures 3 illustrated in FIG. 6, in which case only the regions which are dark are transmissive and the rest of the object structure is opaque. The use of the object array from FIG. 6 in a multi-aperture projection display now results in the number "1" being sharply imaged in a different projection plane to the number "2", but the respective other number is not visible in the corresponding projection plane. If an obstacle moves between the projection planes of the two numbers, the number of one projection plane disappears and the number of the other projection plane appears.

The principle in FIG. 3 to FIG. 6 can be applied without any problems to more than two separate arrays of object structures, the common transmissive regions of the more than two object structures then being combined in this case using an AND operation. Furthermore, the principle can also be applied without any problems to oblique or arbitrarily shaped projection surfaces in which the individual object structures are suitably distorted images in order to hereby achieve the representation in a free-form projection plane. This projection onto free-form surfaces is described in the document DE 10 2011 076 083 A1 mentioned at the outset.

By virtue of the fact that a different symbol is used for the object structures 3" than for the object structures 3' according to FIG. 3 to FIG. 6, different symbols can hereby be generated at different projection distances from the motor vehicle. In one embodiment of the motor vehicle according to the invention, this is used to achieve roadworks or confined space light or a passive distance display for a parking assistance system, as explained below using FIG. 7 to FIG. 9.

Figure 7:
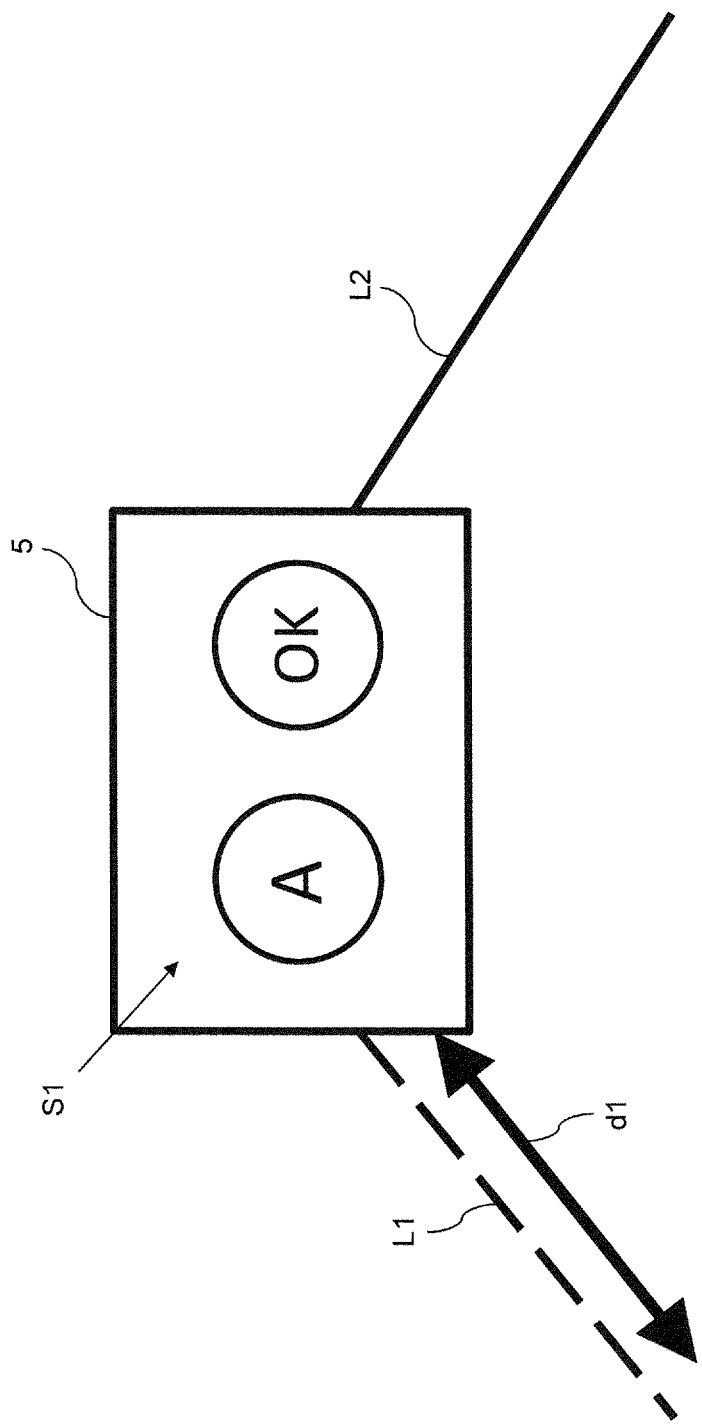
FIG. 7 to FIG. 9 show perspective views, as seen from the windshield, of embodiments of a motor vehicle according to the invention, in which case different variants of symbols are illustrated.
Figure 8:
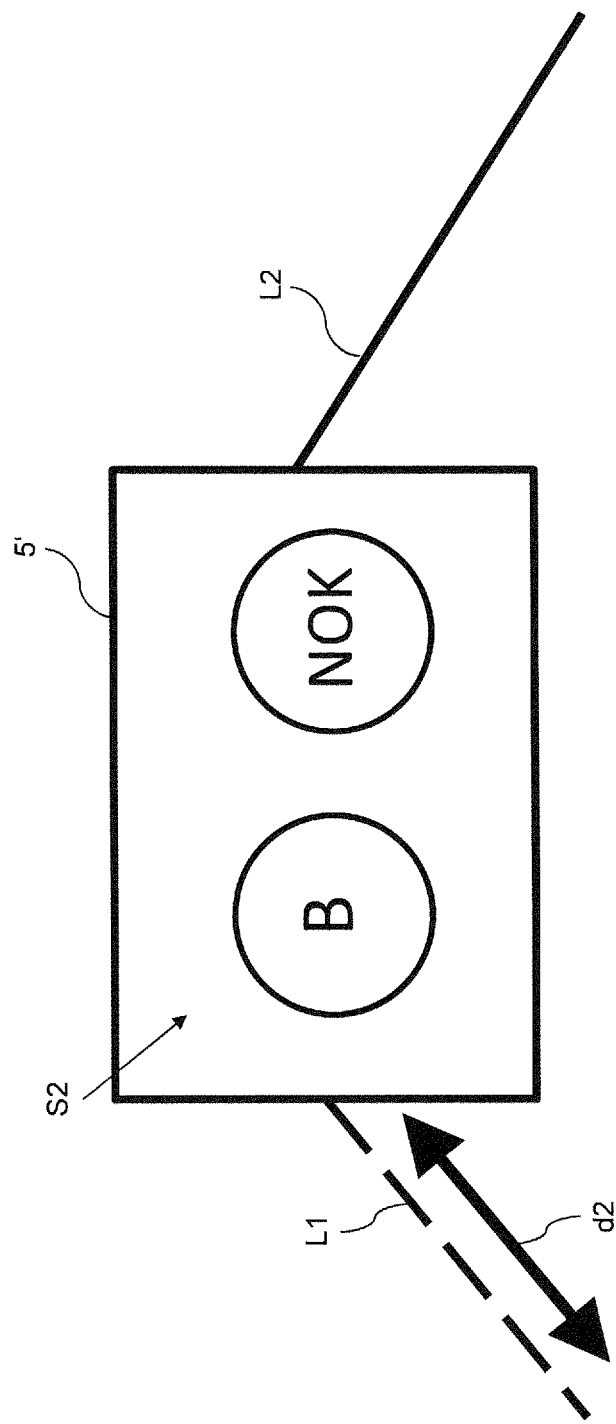
Figure 9:
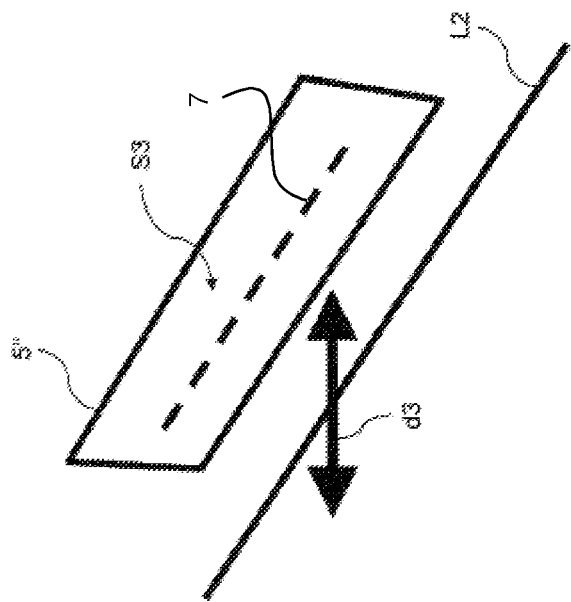
Figure 9:
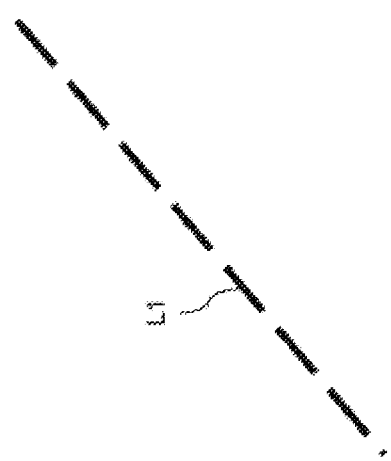

FIG. 7 to FIG. 9 show a perspective illustration of a right-hand lane of a road, the lane being delimited by the road center line L1 and the right-hand road edge line L2. In this case, the viewing direction of the driver from the windshield of one embodiment of the motor vehicle according to the invention is illustrated. FIG. 7 and FIG. 8 show the implementation of a parking assistance system with the multi-aperture projection display described above, such a multi-aperture projection display being installed in the left and right headlights and representing respectively different symbols in two different projection planes perpendicular to the vehicle front. In this case, one projection plane 5 is at a greater distance d1 (FIG. 7) from the vehicle front than the other projection plane 5', the distance of which from the motor vehicle assumes the smaller value d2.

In the scenario in FIG. 7, the projection displays in the headlights generate a first symbol S1, the left headlight indicating a circle with the letter "A" therein and the right headlight representing a circle with the letters "OK" therein. The corresponding symbols are exemplary and can also have any other desired configuration. In contrast to this, according to FIG. 8, the symbol S2 which differs from the symbol S1 is illustrated in the projection plane 5' at the shorter distance d2 from the vehicle front. This symbol is represented, by way of example, by a circle having the letter "B" (generated by the left headlight) therein and by a circle having the symbol sequence "NOK" (generated by the right headlight) contained therein. The symbols "NOK=not okay" are used to convey to the driver that the distance to the vehicle in front or to another object in front is becoming very short and the risk of an accident during parking therefore exists. In contrast to this, it is conveyed to the driver, at a greater distance from the corresponding projection plane according to FIG. 7, that there is not yet any risk of an accident ("OK=okay").

The embodiment according to FIG. 7 and FIG. 8 therefore provides a passive distance control during parking by projecting different symbols in different projection planes, which distance control is used to convey the distance to objects in front of the vehicle front to the driver. The system can similarly also be integrated in taillights of the vehicle, with the corresponding symbols being represented to the driver in this case using a rearview camera of the motor vehicle, for example.

In the parking assistance system from FIGS. 7 and 8, the distances d1 and d2 are in the range of a few centimeters, for example in the range of 10 cm to 50 cm. If appropriate, however, the system from FIG. 7 and FIG. 8 can also be used for distance control with respect to a motor vehicle traveling in front during the journey of the motor vehicle. In this case, the distances d1 and d2 are accordingly selected to be larger and are in the range of several meters.

FIG. 9 shows a scenario in which roadworks or confined space light is achieved in the motor vehicle according to the invention using a multi-aperture projection display. In a similar manner to FIG. 7 and FIG. 8, the lane is represented by the road center line L1 and the right-hand road edge line L2 from the point of view of the driver of the motor vehicle. However, an oblique projection plane 5" having a predefined offset d3 with respect to the right-hand vehicle side is now generated. A line 7 which runs parallel to the vehicle longitudinal axis is represented in this projection plane. This conveys to the driver that the distance between the right-hand side of his motor vehicle and a corresponding object, onto which the projection plane 5" is projected, undershoots a particular magnitude. The distance d3 may be 20 cm, for example, and may possibly also be more or less with respect to the right-hand vehicle longitudinal side. The symbols in the projection plane 5" (e.g., line 7) are therefore used to convey to the driver how close the right-hand vehicle longitudinal side is to a confined space, which is helpful, in particular, when driving through roadworks.

In the same manner, a further projection plane having an offset with respect to the left-hand vehicle longitudinal side is preferably produced using a further multi-aperture projection display. These symbols also contain a corresponding line (e.g., line 7). This makes it possible to visualize a distance to confined spaces to the driver inside a virtual tunnel.

If necessary, a plurality of projection planes may also be respectively generated to the right and left of the corresponding vehicle longitudinal side in the scenario in FIG. 9 by means of the multi-aperture projection displays. This continuously conveys to the driver how close his vehicle is to lateral objects. In particular, the projection plane at the shortest distance from the corresponding longitudinal side of the vehicle may comprise a warning message in this case. Such a warning message can be implemented, for example, by representing a solid line instead of dashed lines, which solid line conveys to the driver that there is the risk of a collision with lateral objects.

As described above, different symbols are generated in different projection planes at a different distance from the vehicle in some of the embodiments just explained. In other words, different symbols are clearly visible to the driver at different observation distances. When moving from one projection plane to another projection plane having different symbols, the symbols in one projection plane disappear gradually, while the symbols in the other projection plane slowly appear until they are finally sharply represented in the projection plane. The described method for object generation prevents the illumination of dark surfaces in the desired images of the projection planes. In the far field outside the projection planes, all images are superimposed, with the result that a homogeneous light image is produced and the symbols are no longer discernible. Depending on the configuration, the different symbols can be selected differently. If necessary, a symbol can also indicate a corresponding distance between the projection plane and the vehicle in numbers.

The embodiments of the invention described above have a number of advantages. In particular, the technology of the multi-aperture projection display can be used to implement the function of a passive parking assistance system or roadworks light in a very cost-effective manner. Visual feedback is therefore also possible without looking at a display in the vehicle or a head-up display. The function of representing symbols in different projection planes can be greatly miniaturized on account of the compact design of multi-aperture projection displays and can also be combined with other functions, for example low beam.

LIST OF REFERENCE SYMBOLS

1 Luminous means
2 Condenser lenses
3, 3', 3" Object structures
4 Projection lenses
5, 5', 5" Projection planes
6 Glass substrate
10 Multi-aperture projection display
d1, d2, d3 Distance
S1, S2, S3 Symbols
L1 Road center line
L2 Road edge line The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:
1. A motor vehicle comprising:
an illumination device, which includes one or more multi-aperture projection displays, each multi-aperture projection display containing:
a luminous means for illuminating a plurality of object structures, and
an array of projection lenses, each projection lens assigned to a respective set of the plurality of object structures, each set including at least a first object structure and a second object structure,
wherein via simultaneous illumination of the plurality of object structures by the luminous means:
the first object structures of each set are projected by the respective projection lenses into a first projection plane extending perpendicularly or obliquely with respect to the ground in an area surrounding the motor vehicle, such that a first overall image containing first symbols perceivable by a driver of the motor vehicle are generated in the first projection plane, and
the second object structures of each set are projected by the respective projection lenses into a second projection plane, different from the first projection plane, extending perpendicularly or obliquely with respect to the ground area in the area surrounding the vehicle, such that a second overall image, different from the first overall image, containing second symbols perceivable by the driver are generated in the second projection plane, wherein the first projection plane and the second projection plane are located at different respective distances from the motor vehicle.

2. The motor vehicle as claimed in claim 1, wherein at least some of said symbols respectively comprise at least one character, pictogram and number.

3. The motor vehicle as claimed in claim 1, wherein at least some of said symbols respectively indicate a distance between a corresponding projection plane and the motor vehicle.

4. The motor vehicle as claimed in claim 1, wherein at least some of the symbols respectively comprise a warning for the driver.

5. The motor vehicle as claimed in claim 4, wherein the warning for the driver comprises one of the symbols in a respective projection plane at a shortest distance from the motor vehicle, or the symbols in projection planes whose distance from the motor vehicle undershoots a predetermined threshold.

6. The motor vehicle as claimed in claim 1, wherein for at least one of the one or more multi-aperture projection displays, at least one of the respective projection planes is substantially perpendicular to a front of the motor vehicle.

7. The motor vehicle as claimed in claim 1, wherein for at least one of the one or more multi-aperture projection displays, at least one of the respective projection planes is substantially perpendicular to a rear of the motor vehicle.

8. The motor vehicle as claimed in claim 1, wherein for at one of the one or more multi-aperture projection displays, at least one of the respective projection planes runs parallel to a longitudinal axis of the motor vehicle and is arranged in a manner offset with respect to a longitudinal side of the motor vehicle.

9. The motor vehicle as claimed in claim 8, wherein the symbols comprise a line running parallel to the longitudinal axis of the motor vehicle.

10. The motor vehicle as claimed in claim 1, wherein at least one of the one or more multi-aperture projection displays is provided in at least one a headlight and a taillight of the motor vehicle.

11. The motor vehicle as claimed in claim 10, wherein the multi-aperture projection displays are respectively provided in at least one of left and right headlights and left and right taillights.

* * * * *